Sept. 20, 1955  B. A. RÖRHOLT  2,718,071
RADIO WAVE PROPAGATION MODEL
Filed June 8, 1954  2 Sheets-Sheet 1

United States Patent Office 2,718,071
Patented Sept. 20, 1955

2,718,071
RADIO WAVE PROPAGATION MODEL
Björn A. Rörholt, Smestad, near Oslo, Norway
Application June 8, 1954, Serial No. 435,238
7 Claims. (Cl. 35—19)

The present invention concerns a training aid which gives a visual impression of the propagation of radio waves through the ionosphere.

The main purpose of the invention is to provide an analogue demonstration apparatus which can serve to illustrate the principles and physical laws governing the refraction of electromagnetic waves in the ionosphere by giving a visual and qualitatively correct picture of the interdependence of the main factors involved without reference to the somewhat complex underlying theory.

To this end the invention consists in a mechanical analogue model of the ionosphere, comprising a corrugated but substantially horizontal surface over which a ball, used to represent a radio wave, will move in a path which will be similar to the path of the corresponding radio wave through the ionosphere, thereby visually demonstrating the refraction of the radio wave and its return to the surface of the earth as determined by the radio frequency and direction of propagation together with the particular density distribution of the ionosphere under study.

The invention further comprises means for giving the mentioned ball a suitable initial velocity and direction corresponding to a given radio frequency and direction of propagation respectively.

The invention also comprises means for projecting an image of the substantially horizontal model surface in a substantially horizontal direction, whereby spectators situated on approximately the same level as the model will obtain such a visual impression of the moving ball that its trajectory would seem to lie in a vertical plane as does indeed the path of the radio wave it represents.

Further purposes and advantages of the invention will be more clear from the following description and the enclosed drawings showing an example of a preferred construction, wherein.

Figure 1:
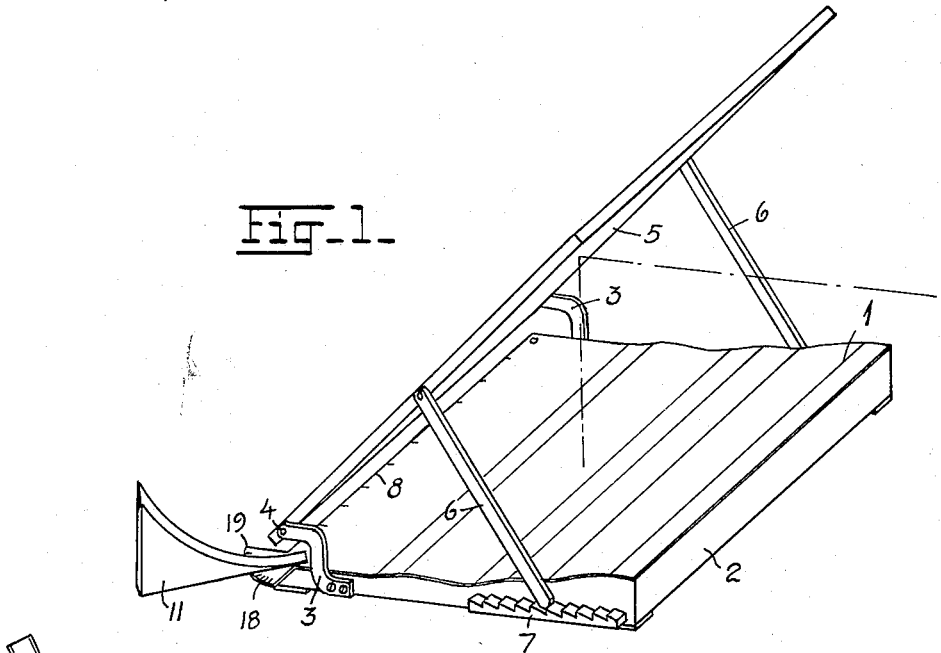
Figure 1 is a schematic isometrical projection of the apparatus.

In the drawings 1 denotes a rectangular sheet, having a profile to be described in further detail below, which sheet is supported by a suitable cradle or support 2. At opposite ends of said support 2 and adjacent one side thereof are mounted brackets 3 having holes for pivot taps 4 protruding from the ends of a frame 5 supporting a mirror the reflecting surface 5', of which, is facing said sheet 1 and inclined toward same as shown. To hold the mirror frame 5 in set position legs 6 are provided at the ends of the frame 5 having their upper ends pivotally secured to said frame and the lower ends adapted to engage racks 7 mounted on the ends of the support 2.

By this arrangement the inclination of the mirror may be adjusted and the mirror may also be lowered against the sheet 1 when the apparatus is not in use.

Figure 3:
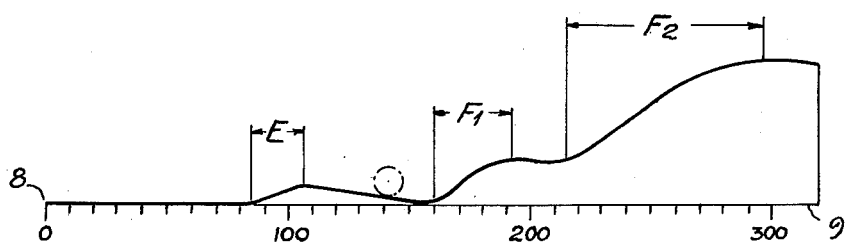
Figure 3 is a profile of same in somewhat greater scale.

The upper or model surface of the sheet 1 represents a vertical section through the ionosphere. The edge 8 of said model surface represents the surface of the earth, a distance along said edge representing distance along the ground. Through the following description and in the claims said edge 8 will be referred to as the base line. The direction 9 at right angle to the base line (see Figure 3) represents vertical distance above the ground.

The sheet 1 is bent or corrugated in such a manner that the elevation of the upper or model surface thereof, above the horizontal zero level plane 9 through the base line 8, is everywhere proportional to the ionization density (measured in free electrons per cubic unit) at the corresponding point in the section of the ionosphere which the model surface represents.

For the sake of simplicity and clarity in demonstrating the essential principles, the model surface has in this case been chosen to represent an ionosphere consisting of three ionized layers, referred to as the E-layer, the $F_1$-layer and the $F_2$-layer, wherein the ionization density varies with height only and is constant in any horizontal plane.

In order that the model should correspond as closely as possible to the commonly used simplified theory of ionospheric refraction it is chosen to represent an ionosphere consisting of three so called "Chapman layers," meaning that the vertical distribution of free electrons corresponds to what is commonly known in the literature as the "Chapman distribution."

The curvature of the earth is ignored in this model because this simplifies the manufacture of the model considerably while its value as a training aid is not correspondingly impaired.

It is possible to take the curvature of the earth into account, and also it is possible to represent any desired electron density distribution, but since the particular model here shown is meant to demonstrate only the essential principles of the refraction of radio waves, it is believed to be advantageous to simplify the model as much as possible.

A steel ball 10 serves to illustrate the propagation of a radio wave through the ionosphere. The ball is brought to roll over the model surface entering on to this surface at a point near one end of the base line 8 with an initial velocity corresponding to the frequency of the radio wave and in a direction corresponding to the direction (elevation angle) of said wave.

In order that the steel ball 10 may be given a suitable initial velocity and direction use is made of a starting chute 11 rotatably supported on a vertical pivot 12 received removably in a corresponding hole through the sheet 1 and support 2 close to the corner at one end of the base line 8.

In order to prevent axial movement of the pivot 12 during adjustment of the chute 11 said pivot may be provided with a circumferential groove co-operating with a spring loaded ball protruding sidewise into said hole or a similar retaining device.

Figure 4:
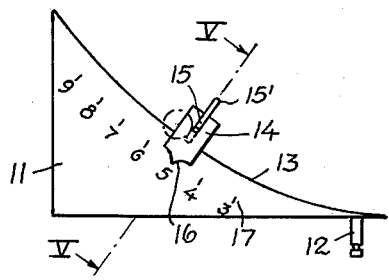
Figure 4 is a side view of the starting chute for the model ball.
Figure 5:
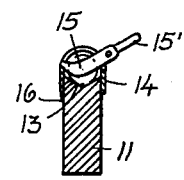
Figure 5 is a cross section along the line V—V in Fig. 4.

The starting chute has a profile as shown in Figure 4 and a cross section of the guiding groove 13 is shown in Figure 5. In order to make it possible to start the steel ball 10 exactly at any desired point in the longitudinal direction of said groove 13 a springy hoop 14 is clamped across the chute, said hoop being so formed that the ball 10 normally may pass undisturbed through same.

To one of the legs of said hoop, pivotally about an axis longitudinally of said groove 13, is secured a retaining member 15 normally extending into the path of the ball. Said member 15 is provided with a protruding operating or trigger arm 15' by means of which it may be swung upwards out of the path and release the ball resting against the same so that the ball is rolling down the chute from the point determined by said retaining member.

By the displacement of the hoop along the groove 13, during which a pointer 16 on the hoop plays over a calibrated frequency scale in megacycles 17 arranged on the chute the retaining member 15 at will may be placed in any of a number of positions corresponding to a number of radio frequencies. Thus, if the member 15 is set to a desired frequency and subsequently a ball 10, which rests against same, is released by removing said member 15, said ball when reaching the model surface has obtained a velocity causing it to follow a similar trajectory as would a radio wave of the indicated frequency.

In order to make it possible to set the starting chute to give the ball an initial direction at the desired angle to the base line 8, said chute may pivot across a graded scale 18 on a segment 19 indicating at any time the angle position of said chute in relation to said base line 8.

The apparatus functions in the following manner:

After the starting mechanism has been adjusted to the desired frequency and the starting chute set to the desired angle with the base line 8, the ball 10 is placed in the guiding groove above the retaining member 15 so that it rests against same. When member 15 is swung upwardly by means of the trigger arms 5' the ball is released and rolls downwardly guided by the groove 13 and enters onto the model surface imparted a velocity corresponding to the frequency of the radio wave and a direction corresponding to the direction of said wave. In rolling over the model, which takes place with negligible friction, the ball 10 owing to the influence of gravity reacts to the corrugations of the model surface in a similar manner as a radio wave reacts to changes in ionization density, thereby imitating the path of a corresponding radio wave.

Figure 2:
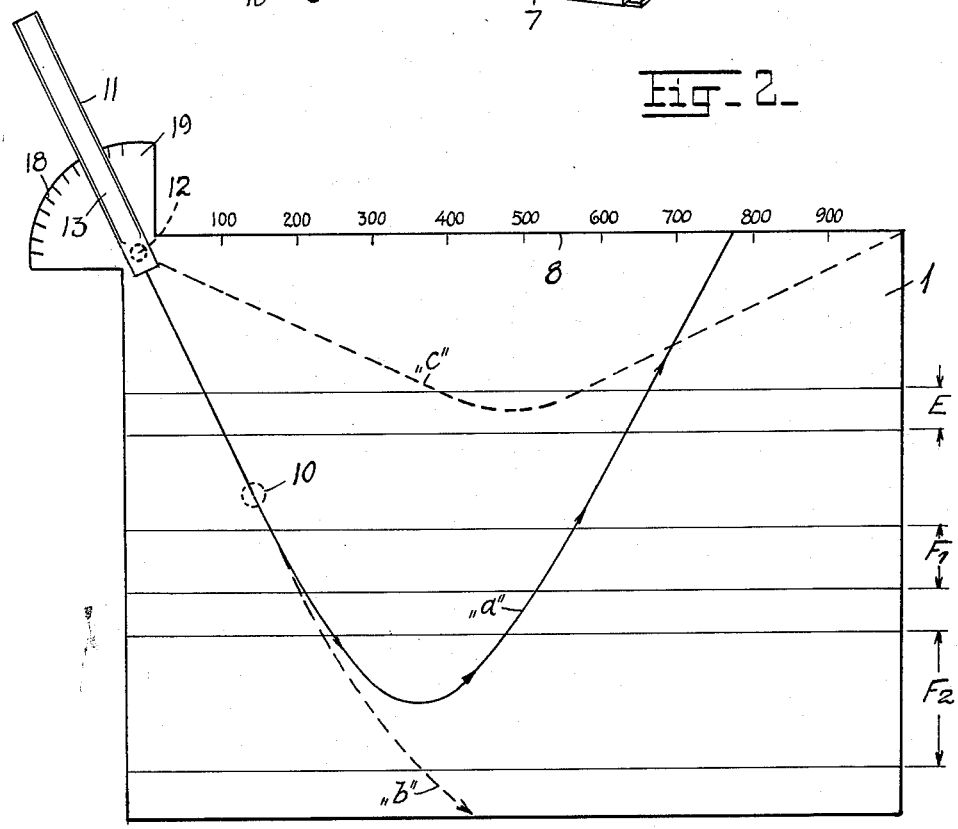
Figure 2 is a plane view of the model surface representing the ionosphere.

In Figure 2 the fully drawn line $a$ corresponds to the path of a radio wave which is returned from the $F_2$ layer to a point on the earth's surface about 760 kilometers distant from the starting point. The dotted line $b$ represents the path of the ball when it is imparted a greater velocity at the point at which it enters the model surface. This velocity can be seen to correspond to a frequency too high to be returned to the earth by any layer in the ionosphere, and therefore waves of that characteristic penetrate the ionosphere and continue into space. Consequently the ball rolls across the model surface and does not return to the base line thereof.

The dotted line $c$ shows the path of the ball 10 when started at a different angle and with a velocity corresponding to that of a radio wave which is returned by the E-layer to a point on the earth's surface about 1000 kilometers distant. The distance and height scales on the model surface are chosen roughly equal and the length of the base line is in the present example taken to represent a distance of about 1000 kilometers along the surface of the earth. Both distance and height scales may be painted on the model surface and be provided with inverted figures in order that the spectators viewing the image of the model surface in the mirror 5 can clearly read the scales. Painted lines also may be placed along the top and lower edge of each of the layers E, $F_1$ and $F_2$ in different colors so that the spectators may easily observe which layer is responsible for the return to earth of the radio wave being imitated on the model. (It is to be understood that the "lower edge" of a Chapman layer is not clearly defined, but the said lines have been placed at the places where substantial increases in electron density with height begin (see Figure 3).)

The ratio between the horizontal and vertical distance scales will be slightly distorted due to the viewing angle, but this will not influence the effectiveness of the demonstration. Another form of distortion is caused by the fact that the ball does not move in the zero level plane but rises up from this plane. This distortion is avoided if the point of reflection is vertically above the model ball, but due to the finite distance of the viewer from the model, this cannot be the case at all points on the model surface at the same time.

The model should therefore be set up in such a way that distortion is avoided near the steep gradients of the E-layer and the lower of the $F_1$ layer.

If photographic records are to be made it is recommended that the model surface should be black and the ball sharply illuminated while a time exposure is made during the movement of the ball over the model surface. For photography the mirror may be removed or swung to an out-of-the-way position.

I claim:

1. A demonstration model capable of giving a visual analogue illustration of the propagation of electro-magnetic waves through a medium having varying refractive index, comprising a generally horizontal model surface simulating a plane section through the refractive medium, one edge of said surface representing a base line, lumps and overall slopes formed in said surface so that the height of each point on said surface above a chosen reference level represents the refractive index at the corresponding point in the said section through the refractive medium, a ball representing a wave packet of electro-magnetic energy adapted to roll over said surface from said base line at an angle thereto and means for imparting to said ball desired initial velocity in a chosen direction.

2. In an analogue demonstration model as in claim 1 a support, a body resting on said support and having an upper surface one edge of which representing a line along the earth's surface, gradients on said surface representing variations in the ionization density in the ionosphere, a ball adapted to roll over said surface starting at said edge, starting means for said ball pivotally secured adjacent one end of said edge, a mirror placed at a sloping angle above said surface and means for adjusting said sloping angle.

3. In an analogue demonstration model as in claim 2, starting means comprising a body, means for supporting said body pivotally about a vertical axis adjacent said edge, a curved guiding path on said body extending outwardly and upwardly from a point level with said edge and releasable ball retaining means mounted adjustably along said guiding path.

4. In an analogue demonstrating model as in claim 3, releasable ball retaining means, a support member for said means adjustably secured adjacent said guiding path and cooperating with a scale extending along said path for positioning said retaining means at different starting points for said ball corresponding to different velocities of said ball when leaving said guiding path.

5. A demonstration model capable of giving a visual analogue illustration of the propagation of electro-magnetic waves through the ionosphere, comprising a generally horizontal model surface representing a plane section through the ionosphere, one edge of said surface representing the base line, lumps and overall slopes formed in said surface so that the height of each point on said surface above a zero level, containing said base line, corresponds to the refractive index at the corresponding point in the ionosphere, a ball representing a wave train of electro-magnetic energy adapted to roll over said surface from said base line at an angle thereto, and means for imparting to said ball a desired initial velocity in a predetermined direction.

6. A demonstration model as in claim 5, having means for projecting an image of said model surface and the ball's movement thereon in a substantially horizontal direction.

7. An analogue demonstration model comprising a generally horizontal surface having lumps and overall slopes formed therein, one edge of said surface representing a base line along the earth's surface, each point of said surface having a height above a horizontal plane through said base line proportional to the ionization density at the corresponding point in the ionosphere, a ball adapted to roll over said surface from said base line at an angle thereto, means for imparting to said ball desired initial velocity in a predetermined direction, and means for projecting an image of said surface in a substantially horizontal direction.

No references listed.